United States Patent
Cho et al.

(10) Patent No.: US 8,064,034 B2
(45) Date of Patent: Nov. 22, 2011

(54) FABRICATION METHOD OF A LIQUID CRYSTAL DISPLAY DEVICE USING A PRINTING METHOD

(75) Inventors: Heung-Lyul Cho, Gyeonggi-Do (KR); Soon-Sung Yoo, Gyeonggi-Do (KR); Young-Gyoung Chang, Gyeonggi-Do (KR); Myoung-Kee Baek, Gyeonggi-Do (KR); Kwon-Shik Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 218 days.

(21) Appl. No.: 10/814,141

(22) Filed: Apr. 1, 2004

(65) Prior Publication Data
US 2004/0196416 A1 Oct. 7, 2004

(30) Foreign Application Priority Data
Apr. 3, 2003 (KR) .................. 10-2003-0021137

(51) Int. Cl.
G02F 1/13 (2006.01)
G02F 1/136 (2006.01)
G02F 1/1333 (2006.01)
G02F 1/1337 (2006.01)
G02F 1/1343 (2006.01)
H01L 27/14 (2006.01)
H01L 29/04 (2006.01)
H01L 29/10 (2006.01)
H01L 29/15 (2006.01)
H01L 31/00 (2006.01)

(52) U.S. Cl. .............. 349/187; 349/43; 349/46; 349/47; 349/122; 349/123; 349/138; 349/139; 349/191; 257/59; 257/72

(58) Field of Classification Search .............. 349/41–46, 349/187, 47, 122, 123, 138, 139, 191; 257/59, 257/72
See application file for complete search history.

(56) References Cited

U.S. PATENT DOCUMENTS

| 5,127,330 A * | 7/1992 | Okazaki et al. ............ 101/450.1 |
| 5,315,196 A * | 5/1994 | Yoshida et al. .................. 310/90 |
| 5,441,593 A * | 8/1995 | Baughman et al. ............. 216/27 |
| 5,668,650 A * | 9/1997 | Mori et al. ........................ 349/42 |
| 5,989,945 A * | 11/1999 | Yudasaka et al. ............. 438/149 |
| 6,160,270 A * | 12/2000 | Holmberg et al. .............. 257/59 |
| 6,686,229 B2 * | 2/2004 | Deane et al. .................. 438/151 |
| 2001/0040648 A1 * | 11/2001 | Ono et al. ........................ 349/43 |
| 2002/0003589 A1 * | 1/2002 | Watanabe et al. ............... 349/43 |

(Continued)

FOREIGN PATENT DOCUMENTS
JP  8-262465 A  10/1996
(Continued)

Primary Examiner — Brian M. Healy
Assistant Examiner — Jerry Blevins
(74) Attorney, Agent, or Firm — Birch, Stewart, Kolasch & Birch, LLP

(57) ABSTRACT

A fabrication method of a liquid crystal display device uses a printing method which forms a pattern of a wider effective line width such as a gate line, a data line, a passivation layer, a pixel electrode, etc. constituting an LCD device. The inventive lithography process uses a mask that is applied at the time of forming a channel region having a narrow effective line width. Accordingly, the amount of resist used may be reduced, and the fabrication process can be simplified. This printing method can be used to fabricate a color filter substrate of an LCD device.

10 Claims, 12 Drawing Sheets

U.S. PATENT DOCUMENTS

| | | | |
|---|---|---|---|
| 2002/0131008 A1* | 9/2002 | Iwase et al. | 349/153 |
| 2002/0135710 A1* | 9/2002 | Chae | 349/43 |
| 2002/0171083 A1* | 11/2002 | Lim et al. | 257/59 |
| 2003/0085404 A1* | 5/2003 | Kim et al. | 257/72 |
| 2003/0219920 A1* | 11/2003 | Baek et al. | 438/30 |
| 2004/0121614 A1* | 6/2004 | Baek et al. | 438/743 |

FOREIGN PATENT DOCUMENTS

| | | |
|---|---|---|
| JP | 2002-268585 A | 9/2002 |

* cited by examiner

US 8,064,034 B2

FABRICATION METHOD OF A LIQUID CRYSTAL DISPLAY DEVICE USING A PRINTING METHOD

This Nonprovisional application claims priority under 35 U.S.C. §119(a) on Patent Application No(s). 2003-21137 filed in KOREA on Apr. 3, 2003, the entire contents of which are hereby incorporated by reference.

BACKGROUND OF THE INVENTION

1. Field of the Invention

The invention relates to a fabrication method of a liquid crystal display (LCD) device, and more particularly, to a fabrication method of an LCD device including a printing method for a gate or data line using pattern having a wider effective line width.

2. Description of the Related Art

Generally, an LCD device includes a thin film transistor (TFT) array substrate having TFTs formed at each intersection of multiple gate lines and data lines, a color filter substrate facing the TFT array substrate and having a color filter layer for displaying a color image, and a liquid crystal filled between the TFT array substrate and the color filter substrate.

The TFT array substrate has a plurality of gate lines are arranged in parallel, and a plurality of data lines are arranged in a perpendicular state to the gate lines. An intersection between the gate lines and the data lines defines a unit pixel region, and TFTs respectively formed at the intersection regions function as switching devices. The TFTs form a matrix arrangement on the TFT array substrate.

The color filter substrate lies opposed to the TFT array substrate and has a color filter layer constituted with sub color filter layers of R (red), G (green), and B (blue) for displaying an image as a color A common electrode for applying an electric field to a liquid crystal can be further provided at the color filter substrate so as to correspond with a pixel electrode formed on the TFT array substrate.

In order to apply an electric field to the liquid crystal, a data signal must be applied not only to the common electrode but also to the pixel electrode formed on the TFT array substrate. Here, the TFT serves as a switching device of the data signal.

Generally, the TFT includes a gate electrode, a source electrode, a drain electrode, and a channel region between the source and drain electrodes.

A fabrication method of a related art TFT can be explained with reference to FIGS. 1A to 1F.

FIGS. 1A to 1F show a TFT fabrication process using 5-mask process.

FIG. 1A shows a gate electrode material 11 that is formed on a substrate 1. The gate electrode material of a metal can be formed on the substrate by a sputtering method. The metal layer forming the gate line can constitute one electrode of a storage region for maintaining a voltage during the time of the TFT operation, and a gate pad pattern at a gate pad portion.

FIG. 1B shows that, after forming the gate metal layer, a photoresist is deposited on the gate metal layer, and photolithography using a first mask M respectively forms a gate line, one electrode of a storage region, and a gate pad portion pattern 2 on the substrate 1.

FIG. 1C shows a gate insulating layer 3, a semiconductor layer and high concentrated N+ layer that are sequentially formed on the resulting material. Then, photoresist is deposited and photolithography using a second mask (not shown) selectively etches the semiconductor layer and the high concentration N+ impurity layer to thus form an active layer 4 above the channel region. Here, the active layer 4 is formed by stacking an amorphous silicon (a-Si) layer as a semiconductor layer and a high concentration N+ layer.

The insulating layer 3 and the active layer 4 are usually deposited by a plasma enhanced chemical vapor deposition (PECVD) method.

Then, a conductive material is formed on the active layer, and as shown in FIG. 1D, a photolithography process is performed by using a third mask (not shown) to thus selectively etch so that the conductive material can be applied as source/drain electrodes 5 and 6 that are separated from each other at the channel region. The conductive material may be applied as one electrode of a storage capacitor at the storage region, and the conductive material may be applied as a data electrode 8 at the data pad portion.

FIG. 1E shows a passivation layer 9 that is formed on the resulting material, and photolithography using a fourth mask (not shown) selectively etches so that the drain electrode of the channel region, the storage electrode 7 of the storage region, the gate pattern 2 of the gate pad portion, and the data electrode 8 of the data pad portion can be exposed.

FIG. 1F shows a pixel electrode material that is formed on the resulting material. Then, photolithography process using a fifth mask (not shown) forms a pixel electrode 10 for connecting the drain electrode 6 of the channel region and the storage electrode 7 of the storage region, and a gate line 11 (connected to the gate pattern 2 of the gate pad portion) and a data line 12 (connected to the data electrode 8 of the data pad portion) are formed.

In this process, the five masks were consecutively applied to form the LCD device.

However, in the step for forming the gate electrode, the step for forming the active layer, the step for forming the source/drain electrodes, the step for forming the contact hole in the passivation layer, and the step for forming the pixel electrode, the process for forming each pattern involves depositing photoresist by a spin coater and exposing. The spin coater uniformly deposits photoresist on a substrate by dropping a predetermined amount of photoresist on the substrate where a metal layer is deposited, and by rotating the substrate at high speed. The spin coater method has a problem arising from only partial utilization of the photoresist dropped on the substrate being used during the subsequent exposure process, and most of the photoresist is not used. Accordingly, a large amount of photoresist is uselessly discarded, and only a small amount of photoresist is used during the lithography process. Only approximately 10% of the photoresist deposited by a single spin coating application is used in the lithography process, and a small amount of the used photoresist, approximately 10-20%, is used during the actual pattern forming.

Also, an expensive mask is used to perform the photolithography process.

SUMMARY OF THE INVENTION

Therefore, an object of the invention is to provide a fabrication method of an LCD device capable of reducing the fabrication cost and simplifying processing. The inventive printing method is applied at the time of forming a pattern of a wider effective line width such as a gate line, a data line, a pixel electrode, etc. constituting an LCD device. A lithography process using a mask is applied at the time of forming a channel region of a narrow effective line width.

The invention, in part, pertains to a fabrication method of a liquid crystal display device that includes forming a gate line on a substrate by applying a gate photoresist pattern by printing, sequentially forming a gate insulating layer, a semiconductor layer, and a high-concentrated N+ layer over the gate line, forming an active region over the high-concentrated N+ layer by applying an active photoresist pattern by printing, forming a conductive layer over the active region, depositing a photoresist layer over the conductive layer, applying a mask over the photoresist layer, performing a lithography process, and thereby forming a source/drain electrode, forming a passivation layer over the source/drain electrode, forming a contact hole over the passivation layer by applying a contact hole photoresist pattern by printing, and forming a pixel electrode on the passivation layer by printing a pixel electrode photoresist pattern.

In the invention, the mask can include a channel region pattern. The printing is ink jet printing or roller printing. The step for forming the source/drain electrode can include defining an active layer by sequentially removing the high-concentrated N+ layer and the semiconductor layer by using the active resist pattern formed by printing as a mask, removing the active resist pattern, sequentially forming a conductive layer and a photoresist layer over the active layer, exposing the photoresist layer, performing a development process, and thereby removing the photoresist layer above a channel region by using the mask including the channel region pattern, and sequentially removing the conductive layer and the high-concentrated N+ layer above the channel region.

The invention, in part, pertains to a fabrication method of a liquid crystal display device that includes forming a gate line over a substrate by applying a gate resist pattern formed by printing, sequentially forming a gate insulating layer, a semiconductor layer, a high-concentrated N+ layer, and a conductive layer over the gate line, forming an active photoresist pattern over the conductive layer by printing, exposing a part of the active photoresist pattern by applying a mask over the active photoresist pattern, forming a source/drain electrode by applying the partially exposed active photoresist pattern as a mask, forming a passivation layer over the source/drain electrode, forming a contact hole over the passivation layer by applying a contact hole photoresist pattern formed by printing as a mask, and forming a pixel electrode over the passivation layer by applying a pixel electrode photoresist pattern formed by printing.

In the invention, the printing can be ink jet printing or roller printing. In the step for exposing a part of the active resist pattern by applying a mask over the active photoresist pattern, an exposed region can be a channel region and only a part of the active resist thickness can be exposed to a certain depth. The step for forming the source/drain electrode can include removing the conductive layer, the high-concentration N layer, and the semiconductor layer by applying the active photoresist pattern partially exposed by the mask as a mask, removing an exposed part of the active photoresist pattern and thereby exposing the conductive layer formed above the channel region, removing the exposed conductive layer and the high-concentrated N+ layer, and removing the active resist pattern.

The invention, in part, pertains to a fabrication method of a liquid crystal display device that includes forming a black matrix over a substrate, forming a color filter layer over the substrate by printing, forming an overcoat layer over the color filter layer, forming a common electrode over the overcoat layer, and forming an alignment layer over the common electrode. The step for forming the color filter layer can include forming a negative first photosensitive color resin over a substrate by printing, forming the first photosensitive color resin only at a first sub color filter region by exposing and developing the first photosensitive color resin by using a mask, printing a second photosensitive color resin over the substrate, and forming the second photosensitive color resin only at a second sub color filter region by exposing and developing the second photosensitive color resin by using a mask, and printing a third photosensitive color resin on the substrate, and forming the third photosensitive color resin only at a third sub color filter region by exposing and developing the third photosensitive color resin by using a mask.

The invention, in part, pertains to a liquid crystal display device, that includes a substrate, a black matrix over the substrate, a printed color filter layer over the substrate, an overcoat layer over the color filter layer, a common electrode over the overcoat layer, and an alignment layer over the common electrode. The printed color filter layer can include a printed first photosensitive color resin at a first sub color filter region, a printed second photosensitive color resin at a second sub color filter region, and a printed third photosensitive color resin at a third sub color filter.

The foregoing and other objects, features, aspects and advantages of the invention will become more apparent from the following detailed description of the invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the preferred embodiments of the invention, examples of which are illustrated in the accompanying drawings.

The inventive printing method forms a resist pattern by using an ink jet injection by a thermal transfer method capable of forming a pattern having a minute line width.

Figure 1A:
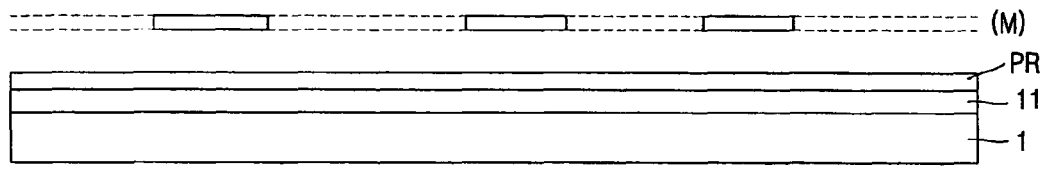
FIGS. 1A to 1F are views showing a fabrication process of an LCD device in accordance with the related art.
Figure 1B:
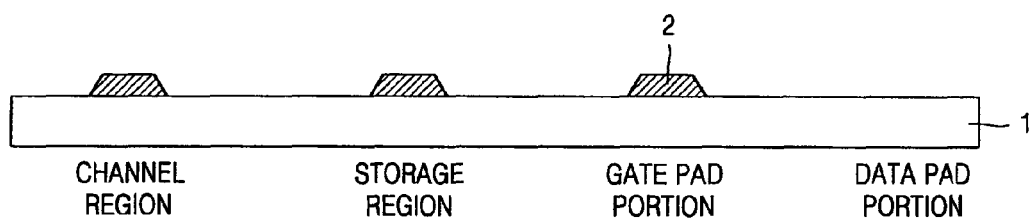
Figure 1C:
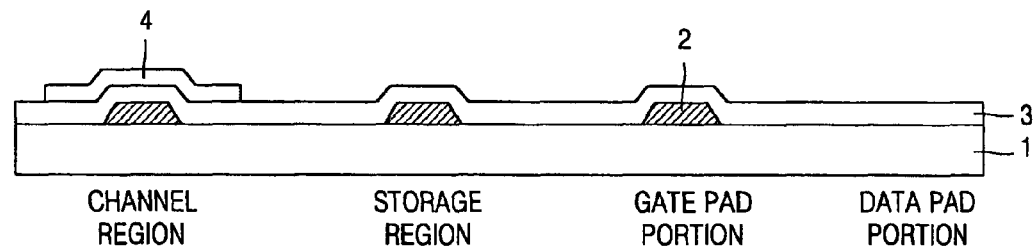
Figure 1D:
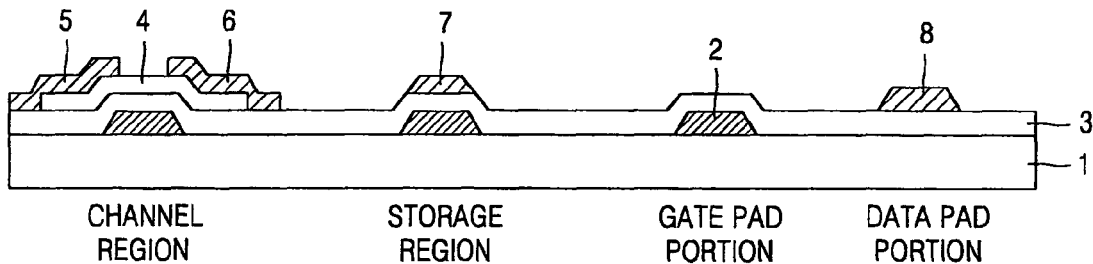
Figure 1E:
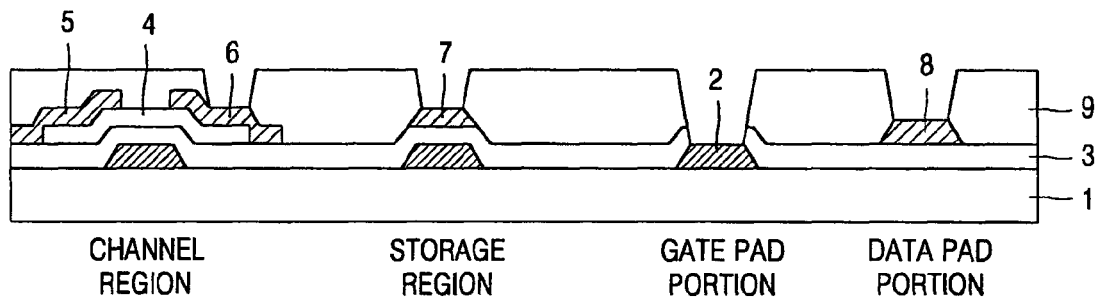
Figure 1F:
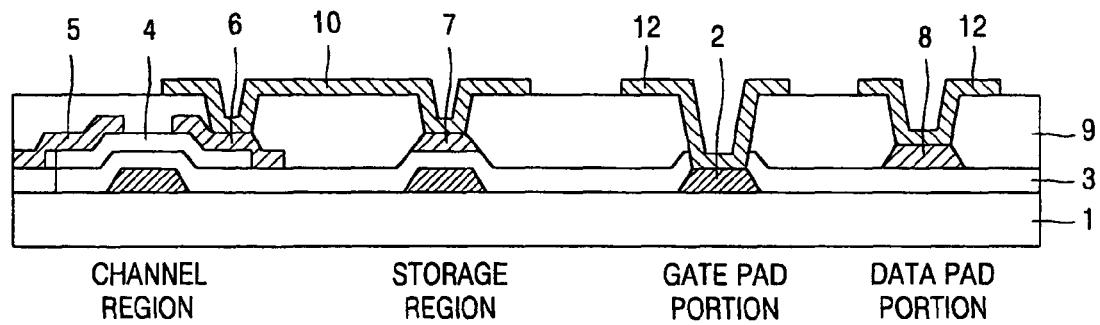
Figure 2:
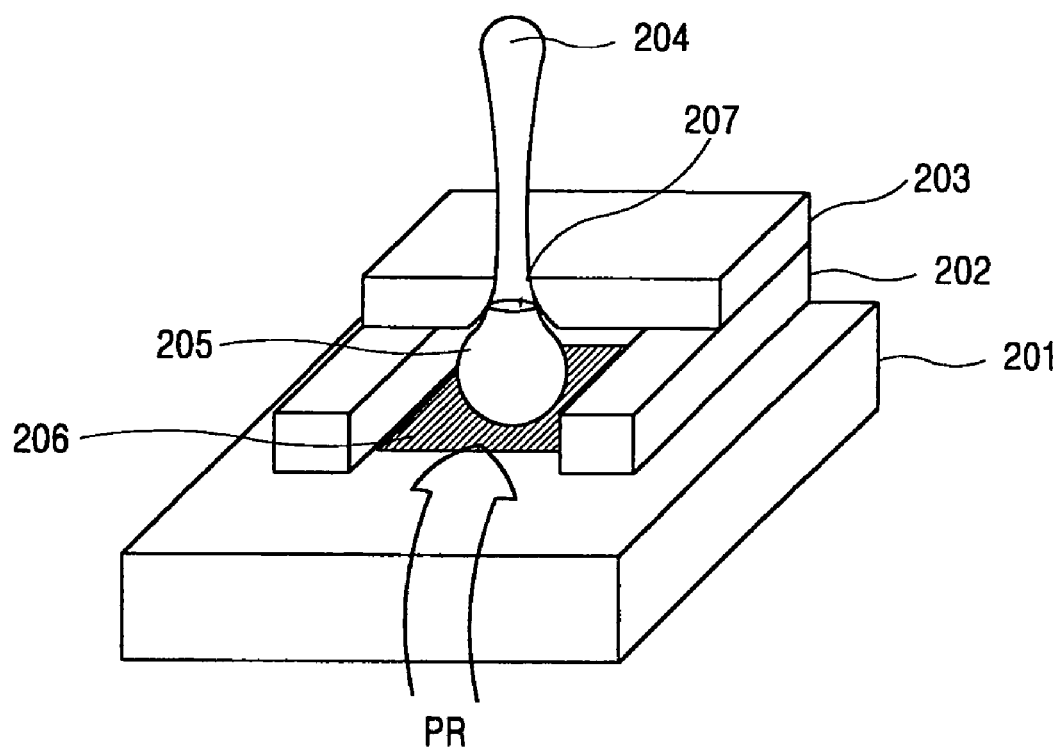
FIG. 2 is a schematic construction view showing an injection nozzle used at an ink jet printing method of the invention.

FIG. 2 shows a principle of the ink jet printing by a thermal transfer method.

A thermal transfer injection nozzle and associated elements include: a silicon substrate 201; a resist storing layer 202 for storing an injected resist; a thin film resistor 206 for heating a thinly-deposited resist electrically; vapor 205 heated by the thin film resistor 206 and injecting a resist; and an injection hole plate 203 including an injection hole that injects a resist.

The thermal transfer injection nozzle is operated as follows.

When a resist stored in a resist storage device (not shown) is injected into an injection nozzle mounted over a thin film resistor 206 at lower surface thereof, the resist is heated by the thin film resistor 206 to thereby generate vapor 205. The vapor 205 upon further heated by the thin film resistor 206 expands, and thus bursts to be discharged in a stream 204 through an injection hole 207. The empty space caused by the vapor burst is then filled with additional resist by the pressure difference. This process is performed within a short time corresponding to several tens of microseconds. However, the time can vary, and times as low as 1 microsecond and as high as 100 microseconds can be used.

A fabrication method of an LCD device using the inventive ink jet printing method and the inventive injection nozzle will be explained with reference to FIGS. 3A to 3F.

First, a metal layer to be used as a gate electrode is deposited on a substrate 300, preferably by a sputtering method. The metal layer constitutes not only a gate electrode, but also one electrode of a storage region and an electrode of a gate pad portion.

Figure 3A:
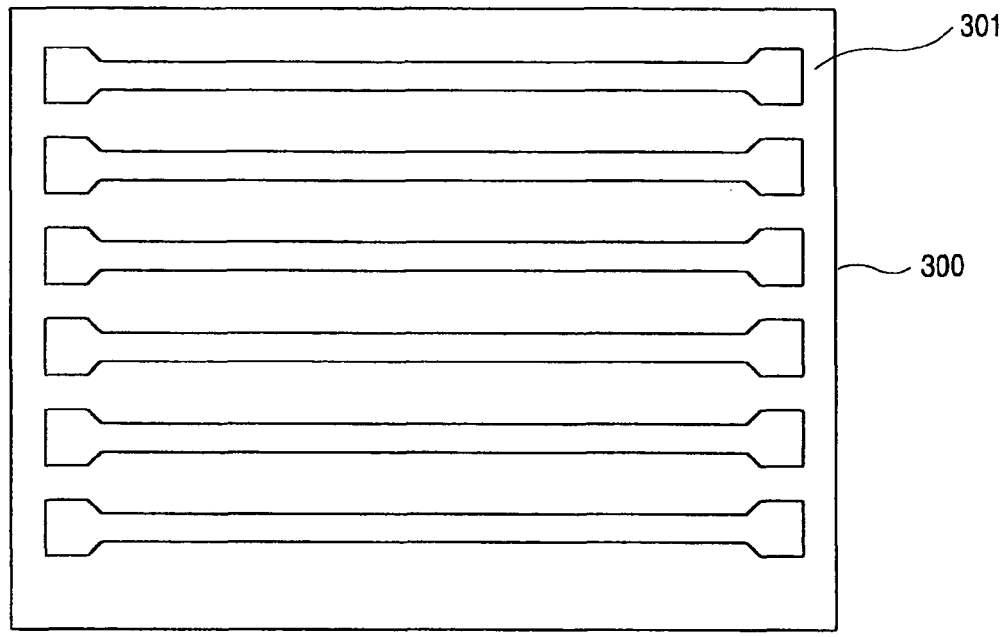
FIGS. 3A to 3J are views showing a fabrication process of an LCD device by a printing method according to the invention.
Figure 3B:
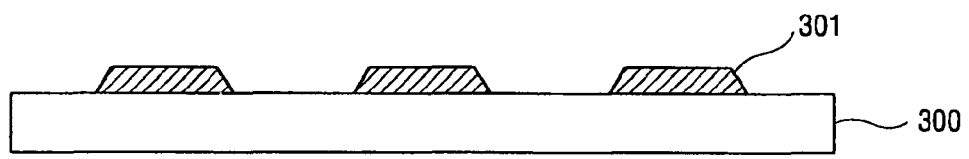

After depositing the metal layer, a gate electrode pattern composed of a photoresist is formed on the metal layer by an ink jet injection method. Next, as shown in FIG. 3A, a gate line pattern 301 forms by etching a gate electrode pattern that has been applied as a mask. FIG. 3A shows a plan view of the gate line pattern, and FIG. 3B shows a sectional view of the gate line pattern.

Figure 3C:
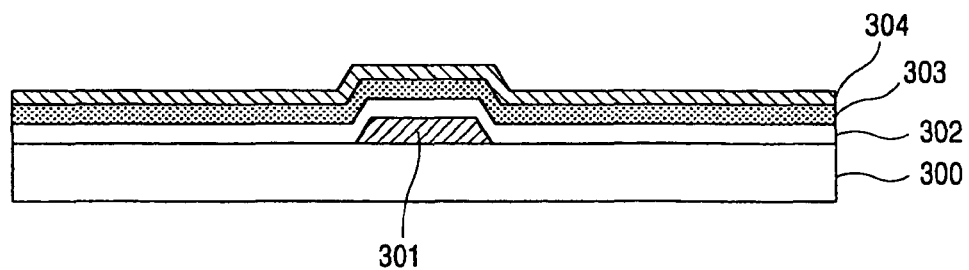

FIG. 3C shows a gate insulating layer 302, an amorphous silicon layer 303, and an N+ high-concentrated impurity layer 304 that are sequentially formed over the gate line 301.

Figure 3D:
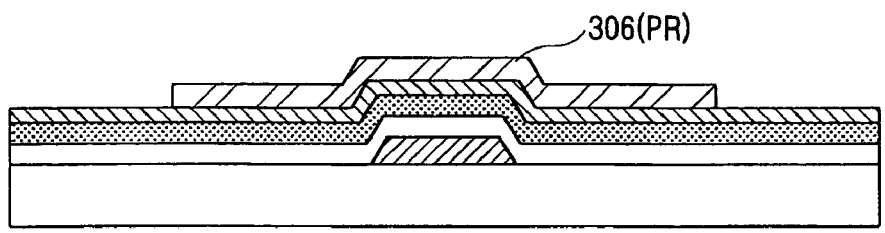

FIG. 3D shows an overlying photoresist pattern 306 that is formed by ink jet injection to define an active region.

Figure 3E:
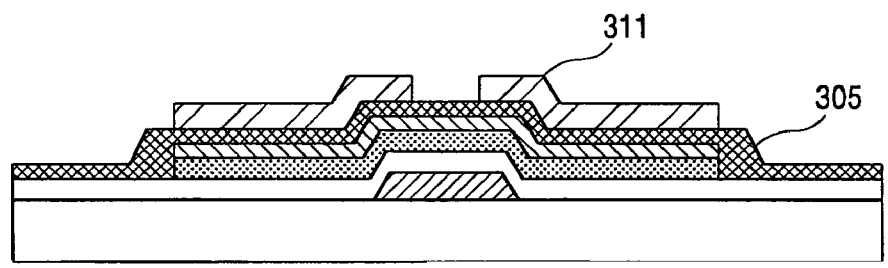

As shown in FIG. 3E, the N+ layer 304 and the amorphous silicon layer 303 on the residual regions where the resist is not deposited are etched and removed by using the photoresist 306 as a mask. Then, the photoresist 306 is removed. Next, a conductive layer 305 for forming a source/drain electrode is deposited on the resulting material, photoresist 311 is deposited, a mask is applied, an exposure is performed, and a source/drain electrode pattern is thereby formed. As a result, the photoresist pattern 311 for forming a source/drain electrode is complete. This mask is the only mask used in the invention.

Figure 3F:
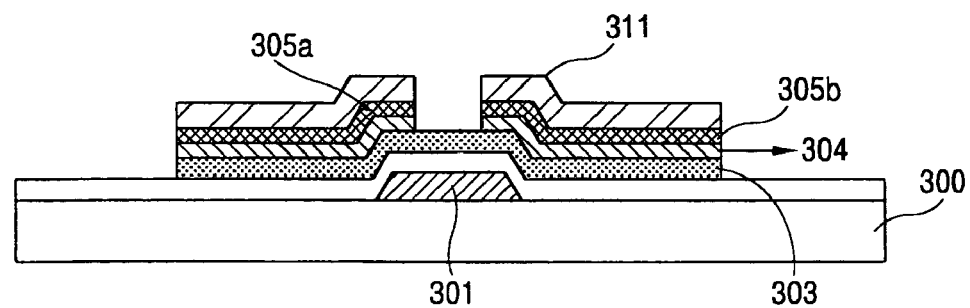

Next, as shown in FIG. 3F, the conductive layer that is not covered by the photoresist pattern 311 formed by the mask process is removed by wet-etching. After the wet-etching, the high-concentrated N+ layer 303 over the channel layer is removed by a dry etching, thereby electrically separating the source electrode 305a from the drain electrode 305b.

FIG. 3F shows that the source electrode 305a and the drain electrode 305b are formed, and the channel layer is opened.

When the source/drain electrodes 305a, 305b are formed, a data line and a storage electrode pattern 307 may be formed simultaneously by using the mask process.

Figure 3G:
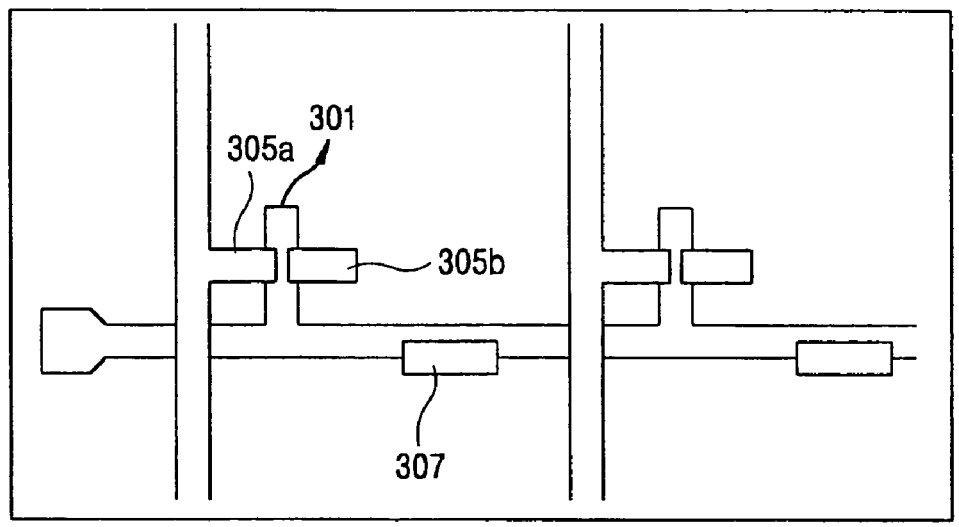

FIG. 3G shows a plane view of the source/drain electrode pattern, the data line, and the storage electrode pattern 307 of a capacitor formed at the storage region.

Figure 3H:
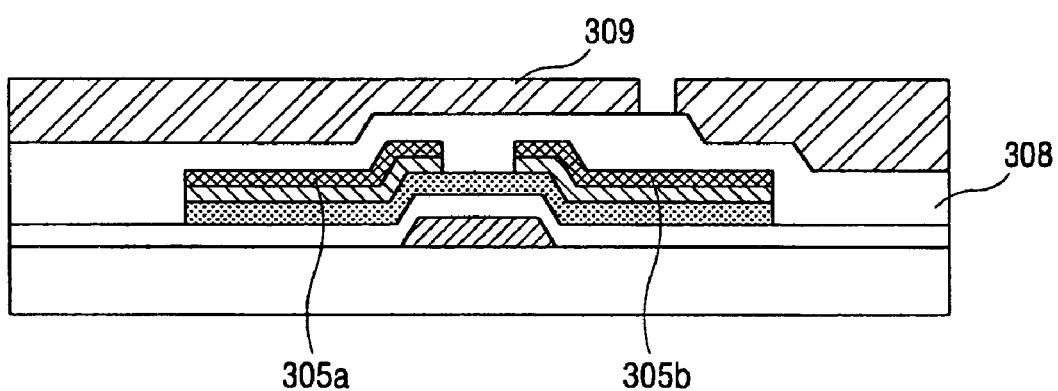

FIG. 3H shows that after forming the source/drain electrode, a passivation layer 308 is deposited over the resulting material. The passivation layer 308 may be formed by using a silicon nitride layer-based inorganic layer or an organic layer of BCB (benzocyclobutene) or acrylic resin.

After forming the passivation layer 308, a photoresist pattern for forming a contact hole is deposited on the passivation layer by using ink jet injection.

Figure 3I:
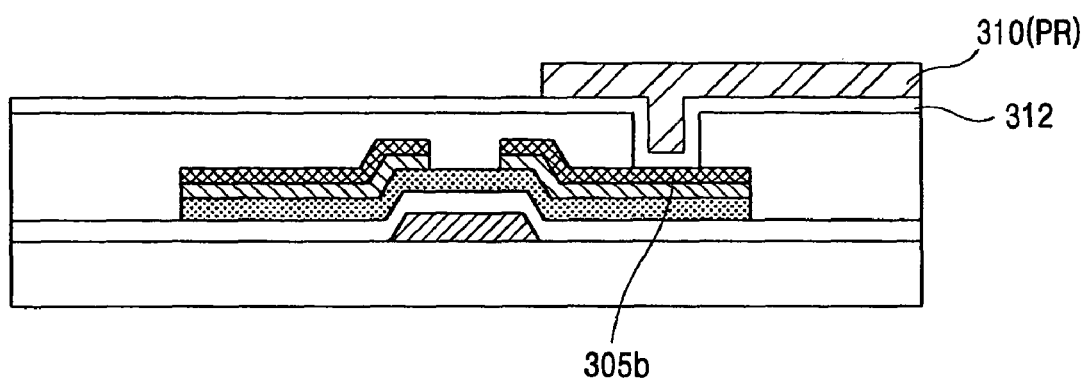
Figure 3J:
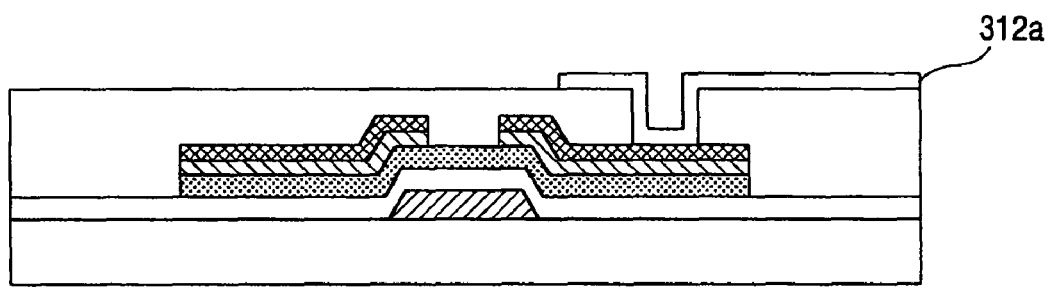

FIG. 3I shows the passivation layer being etched by using the photoresist pattern for forming a contact hole as a mask, thereby forming a contact hole so that the drain electrode 305b can be exposed. Then, a transparent electrode 312 is deposited over the passivation layer including the contact hole. The transparent electrode can be formed from indium tin oxide (ITO) or indium zinc oxide (IZO).

After forming the transparent electrode over the entire substrate, a pixel electrode pattern resist 310 is deposited thereon using ink jet injection.

Then, transparent electrode layer 312 is etched while using the pixel electrode pattern photoresist 310 as a mask, thereby forming a pixel electrode 312a.

The pixel electrode 312a is a transparent conductive electrode, and is composed of indium tin oxide (ITO) or indium zinc oxide (IZO).

The explanation above covered a fabrication method of an LCD device using ink jet injection method.

Hereinafter, a fabrication method of an LCD device using a roller printing method will be explained with reference to FIGS. 4A to 5E.

The fabrication method of an LCD device by a roller printing method is similar as the fabrication method of an LCD device by the ink jet injection method, except for the transfer method of the photoresist.

Figure 4A:
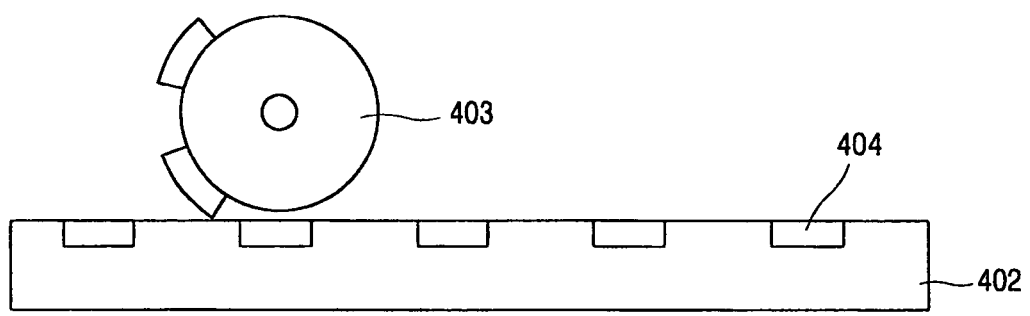
FIGS. 4A and 4B is a schematic explanatory view showing a principle of a roller printing method according to the invention.
Figure 4B:
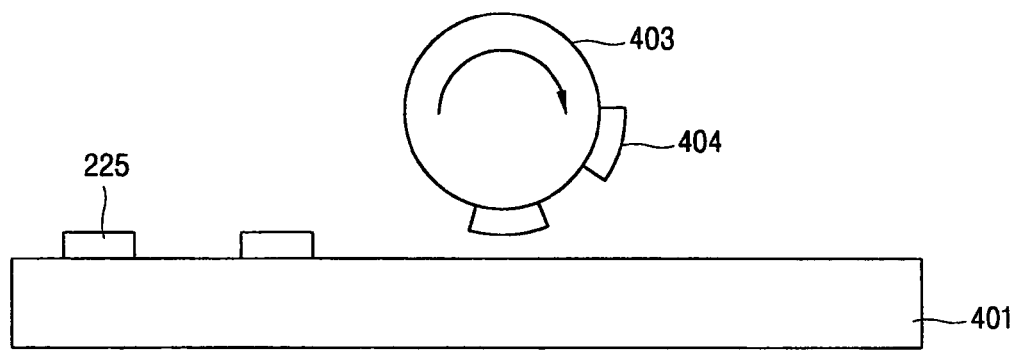

FIGS. 4A and 4B show a schematic explanation illustrating how a pattern is transferred by roller printing.

In FIG. 4A, a cliché 401 has an intaglio pattern of a groove form. A predetermined amount of photoresist 404 is deposited on the cliché 401. The deposited photoresist is contained in the groove. Extra photoresist on the cliché 402 is removed by a photoresist removing means such as a doctor blade (not shown) or a wire. Accordingly, the resist is contained only in the intaglio pattern of the cliché 402.

FIG. 4A also shows a roller 403 in contact with the cliché in which the photoresist is contained. The roller 403 rotates on the cliché 402 to thereby transfer the photoresist 404 contained in the cliché onto a surface of the roller 403. As the result, the certain amount of resist transfers onto the surface of the roller.

Next, the roller 403 is contacted with the substrate 401 and rotated on the substrate 401, thereby re-transferring the resist pattern onto the substrate 401.

Since the size of the roller 403 is smaller than that of the substrate, the processes are repeated several times, and the resist pattern thereby forms on the entire substrate. In the process for repeating the re-transferring several times, inconsistency between each pattern may be generated at the time of aligning patterns. This mis-alignment may be solved by arranging a plurality of alignment marks on the substrate and correctly positioning each pattern to each alignment mark at the time of transferring.

The fabrication method of an LCD device by the roller printing method of the invention is the same as the fabrication method of an LCD device by the ink jet injection method shown in FIGS. 3A to 3J except the following. In the method by the roller printing method, a roller printing method is used instead of an ink jet injection method as a transferring method of a resist.

That is, a pattern is formed by the roller printing method in a step for transferring a resist of a gate pattern onto a substrate, a step for transferring a resist of an active layer pattern onto a substrate, a step for transferring a resist of a contact hole pattern onto a passivation layer, and a step for transferring a resist of a pixel electrode pattern onto the passivation layer.

The resist pattern formed at each step is applied as a mask of an etching process thus to form a corresponding layer such as a gate line, an active layer, and etc.

Preferred Embodiment 2

In the first preferred embodiment, the LCD device was fabricated by lithography using four-time resist pattern transferring processes and one mask.

Hereinafter, more simplified fabrication method of an LCD device by a printing method will be explained. That is, the fabrication process of the LCD device is simplified by consecutively depositing a conductive layer on an active layer and applying a partial exposure.

The fabrication method of an LCD device according to a second embodiment of the invention includes forming a gate line on a substrate by applying a gate line pattern formed by a printing method, sequentially depositing a gate insulating layer, an active layer, and a conductive layer thereon, forming a resist pattern for defining an active region by a printing method, exposing the resist pattern for defining a channel region by using a mask, removing the conductive layer and the active layer existing at regions where the resist pattern is not formed, ashing the resist pattern, partially removing the conductive layer above the channel region, and thereby forming a source/drain electrode, forming a passivation layer on the source/drain electrode, forming a resist of a contact hole pattern by a printing method, and forming a transparent electrode on the passivation layer and forming a pixel electrode by applying a pixel electrode pattern formed by a printing method.

Details will be explained with reference to FIG. 5.

Figure 5A:
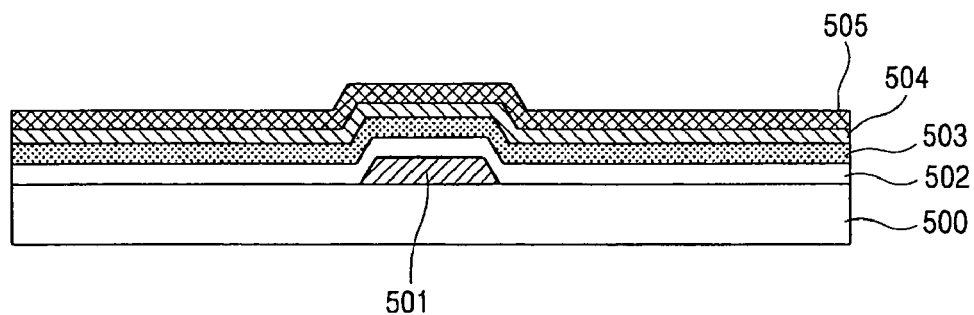
FIGS. 5A to 5E are views showing a fabrication process of an LCD device by a printing method according to another embodiment of the invention.

FIG. 5A shows a gate line 501 being formed on a substrate 500. Here, a resist of a gate pattern is deposited by a printing method. This printing method can be either an ink jet printing method or a roller printing.

Next, a gate insulating layer 502, an amorphous silicon layer 503, an N+ ohmic contact layer 504 formed by doping a high-concentration impurity, and a conductive layer 505 are sequentially formed on the substrate 500 where the gate line 501 is formed.

Then, a photoresist 506 for defining an active region of a TFT is formed by a printing method.

Figure 5B:
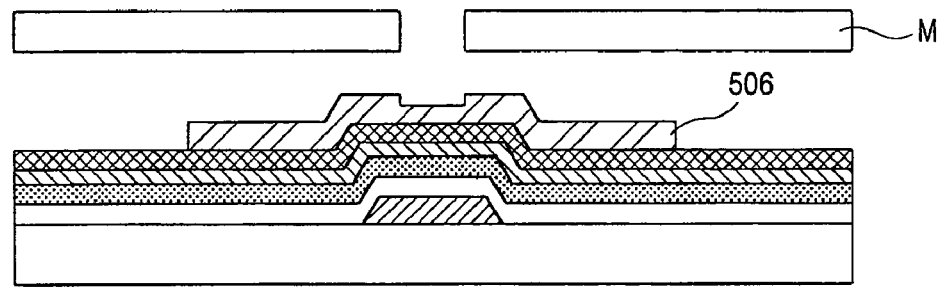

FIG. 5B shows an exposure being performed by using a mask M. Here, exposure energy is controlled in order to expose only a part of the photoresist above the channel region. After development, the resist pattern 506 is stepped.

In a fabrication method of an LCD device using a conventional diffraction mask, photoresist is deposited using a spin coater, and an active region and a source/drain electrode are formed by an expensive diffraction mask. However, in the preferred embodiment of the invention, a resist pattern for forming an active region is formed by a printing method, and a general mask capable of controlling an optical amount is used instead of the diffraction mask. Also, a stepped resist pattern is formed by controlling exposure energy. That is, the invention applies a feature that a degree of resist removed becomes different at the time of development according to the degree of exposure to light.

Next, by using the stepped photoresist 506 as a mask, the conductive layer 505, the N+ ohmic contact layer 504, and the amorphous silicon layer 503 are sequentially etched to thus be removed.

Figure 5C:
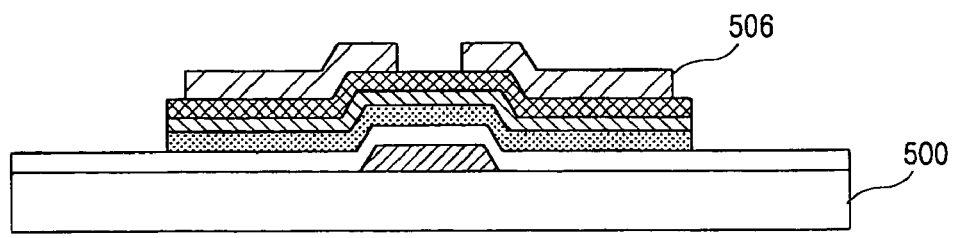

FIG. 5C shows a part of the stepped resist pattern 506 being ashed to thereby remove the resist above the channel region.

Then, the resist pattern separated by the ashing process is used as a mask, and an etching process is performed to thereby etch the conductive layer and the N+ ohmic layer above the channel region.

As a result, a source electrode 505a and a drain electrode 505b electrically separated from each other are formed.

Figure 5D:
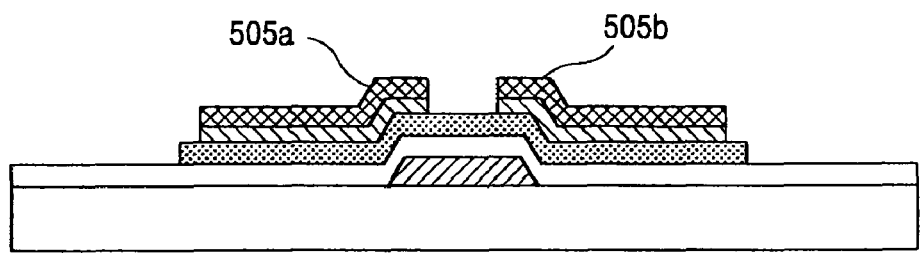

FIG. 5D shows that the source electrode 505a and the drain electrode 505b are separated from each other.

A step of deposing a passivation layer 507 over the resulting structure, a step of forming a contact hole over the passivation layer 507, and a step of forming a pixel electrode 508 over the passivation layer are performed using the same process as described above.

Figure 5E:
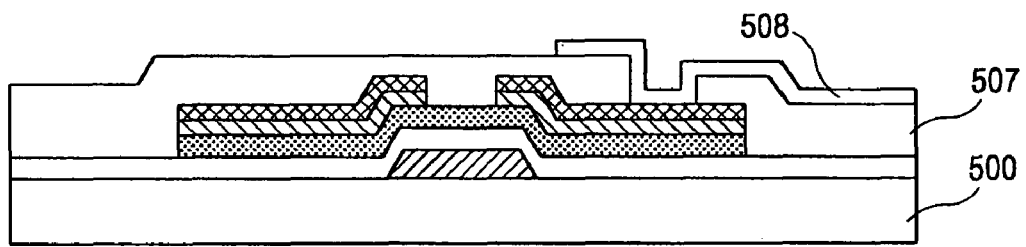

FIG. 5E shows that the passivation layer 507 and the pixel electrode 508 are formed to complete a thin film transistor.

Preferred Embodiment 3

The fabrication method of an LCD device by a printing method according to the invention may be applied not only to a fabrication method of a TFT array substrate including a TFT, but also to a fabrication method of an upper color filter substrate of an LCD device.

The fabrication of a color filter substrate of an LCD device by a printing method according to the invention includes forming a black matrix on a substrate, depositing photosensitive color resin on the black matrix by a printing method, forming a color filter layer by an exposure, forming an overcoat layer so as to compensate a step of the color filter layer; forming a common electrode, and forming an alignment layer on the common electrode.

The fabrication method of a color filter substrate using a printing method according to the invention will be explained with reference to FIGS. 6A to 6E.

Figure 6A:
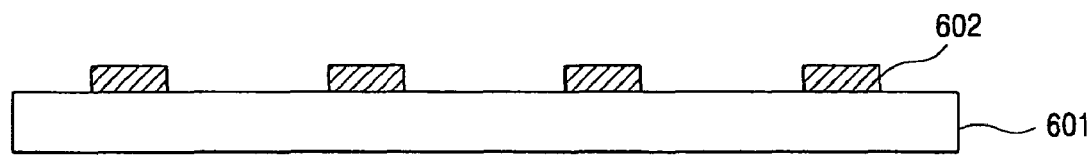
FIGS. 6A to 6E are views showing a fabrication process of a color filter substrate of an LCD device by a printing method according to the invention.

FIG. 6A shows a substrate 601 for fabricating a color filter substrate. A black matrix 602 is formed over the transparent substrate 601.

A black matrix is generally formed between sub color filter layers of R (red), G (green), and B (blue). The black matrix shields light passing through a reverse tilt domain formed at the periphery portion of a pixel electrode of a lower TFT array substrate. The material of the black matrix may a metal thin film such as Cr, or an organic carbon material such as organic pigments can be used. The black matrix can be a pigment-dispersed type or a photopolymerization type.

Figure 6B:
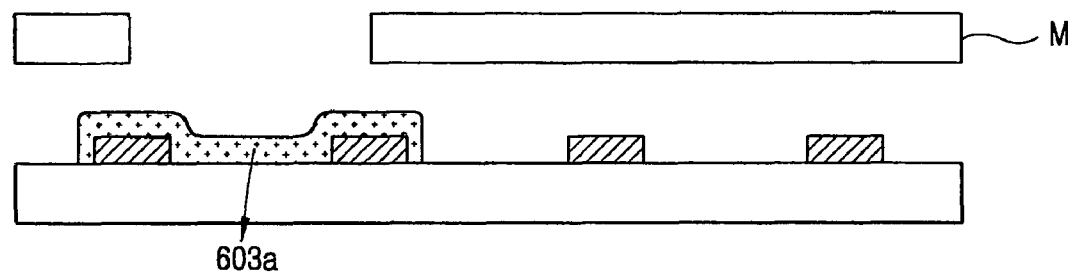

FIG. 6B shows a color filter layer using color resin of R, G, and B. As the color resin, a photosensitive color resin such as a monomer, a binder, etc. is used.

In the invention, it is advantageous to use a negative-type photosensitive color resin, which remains without being removed during the development process at the time of irradiating light energy. However, a positive-type photosensitive color resin can be also used.

Next, a color filter layer is formed over the substrate 601 where the black matrix 602 is formed. The color filter layer may constitute sub color filter layers of R, G, and B. A process for forming the sub color filter layers with R, G, and B sublayers according to a preferred embodiment of the invention will be explained.

FIG. 6B shows a red color resin that is transferred onto a region where a red sub color filter layer is to be formed by printing. Then, the red color resin is exposed by using a mask having the shape of the sub color filter layer pattern. Since the red color resin is a negative photosensitive resin, the color resin of a light-irradiated region remains during the develop process, and the color resin which has been unexposed to light is removed in the developing process. As a result, the sub color filter layers may be precisely formed at the color filter region.

Figure 6C:
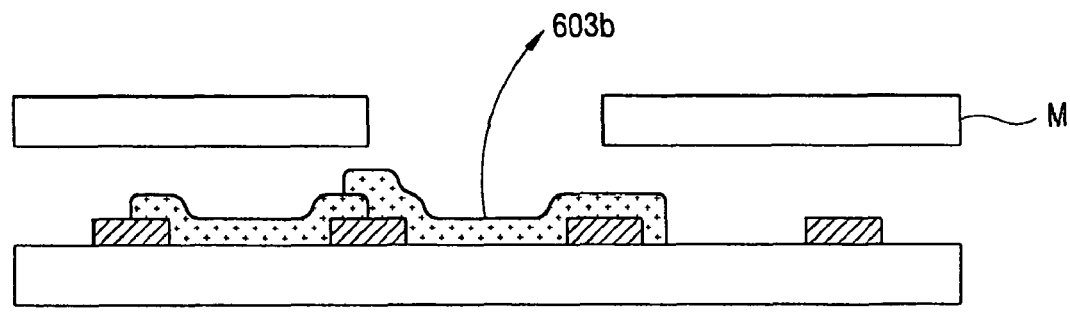

FIG. 6C shows the same process being performed for a green color resin 603b. That is, a green color resin is transferred onto the substrate by a printing method. Then, an exposure process is performed by using a mask, and the color resin which has not been exposed is removed during development.

The mask used for the red colored resin can be also used for the green colored resin, because the size of every sub color filter layer is the same.

Figure 6D:
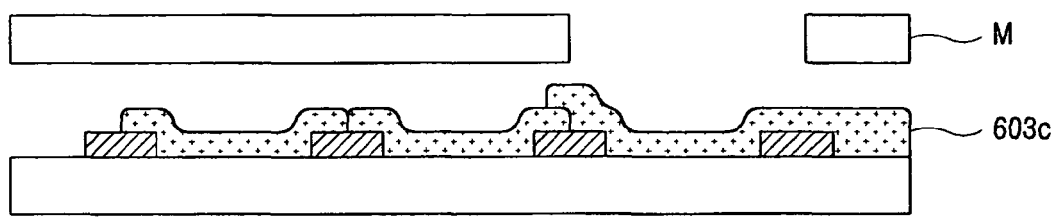

FIG. 6D shows the process being repeated for a blue color filter layer using a blue colored resin.

Figure 6E:
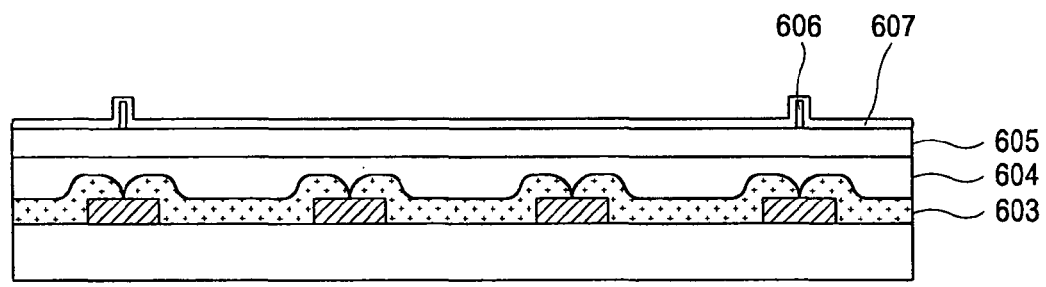

Over the substrate where the color resin has been deposited by the printing method, as shown FIG. 6E, an overcoat layer 604 for compensating a step of the color resin, and a common electrode 605 for applying an electric field to a liquid crystal and an alignment layer 607 are sequentially formed. Afterwards, the common electrode 605, a spacer 606 for spacing a TFT array substrate and a color filter substrate may be further formed.

FIG. 6E shows the completed color filter substrate.

In the invention, a printing method, having less minuteness but easy processing, is applied at the time of forming a pattern of a wider effective line width. A lithography process using a mask is applied at the time of forming a minute part such as the channel region with a narrow effective line width. Accordingly, processes are simplified, and a large amount of photoresist or color resin is not uselessly discarded.

Also, the resist pattern of each layer is formed by the printing method of the invention, and not only the photosensitive resist but also various kinds of resins may be used. The reason is because the resist used in the invention does not require an exposure process for forming a certain pattern and has only to be used as an etching mask at the lithography process. Many types of photoresists can be used in the process, including positive, negative, e-beam and UV resists.

As the invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A fabrication method of a liquid crystal display device, comprising:
    providing a substrate;
    forming a metal layer on the substrate;
    forming a gale photoresist pattern on the metal layer by a first roller printing process;
    etching the metal layer using the gate photoresist pattern as a mask to form gate line;
    removing the gate photoresist pattern;
    sequentially forming a gate insulating layer, a semiconductor layer, and a high-concentrated N+ layer over the substrate and the gate line;
    forming an active photoresist pattern on the high-concentrated N+ layer by a second roller printing process;
    sequentially etching the high-concentrated N+ layer and the semiconductor layer using the active photoresist pattern as a mask to form a semiconductor layer pattern and a high-concentrated N+layer pattern, wherein an active region comprises of the semiconductor layer pattern and the high-concentrated N+ layer pattern;
    removing the active photoresist pattern;
    forming a conductive layer over the active region and the gate insulating layer;
    depositing a photoresist layer over the conductive layer;
    applying a mask over the photoresist layer, and performing a lithography process, to form a photoresist layer pattern;
    removing the conductive layer by using the photoresist layer pattern as a mask to form source and drain electrodes;
    removing the high-concentrated N+ layer pattern above a channel region by using the photoresist layer pattern as a mask, such that the channel region of the semiconductor layer pattern is exposed;
    removing the photoresist layer pattern;
    forming a passivation layer over the substrate and the source and drain electrodes;
    forming a contact hole photoresist pattern over the passivation layer by a third roller printing process;
    removing the passivation layer by using the contact hole photoresist pattern as a mask to form a contact hole exposing the drain electrode;
    removing the contact hole photoresist pattern;
    forming a pixel electrode layer over the passivation layer and the contact hole;
    forming a pixel electrode photoresist pattern over the pixel electrode layer by a fourth roller printing process; and
    removing the pixel electrode layer by using the pixel electrode photoresist pattern as a mask to form a pixel electrode electrically connected with the drain electrode,
    wherein a plurality of alignment marks are simultaneously formed at the time of the roller printing process, and
    wherein the mask applied over the photoresist layer in the step of applying the mask is the only mask applied throughout the method.

2. The method of claim 1, wherein the conductive layer is removed by a wet etch process, and the high-concentrated N+ layer pattern is removed by a dry etch process.

3. The method of claim 1, wherein the each of the first to fourth roller printing processes comprises, providing a cliché having an intaglio pattern of a groove form;
    depositing a predetermining amount of photoresist on the cliché;
    rotating a roller on the cliché to transfer the photoresist contained in the cliché onto a surface the roller; and
    rotating the roller on the substrate to re-transfer the photoresist contained in the roller onto the substrate thereby forming a photoresist pattern on the substrate.

4. The method of claim 1, wherein the photoresist in the first to fourth roller printing processes is one of the gate, active, contact hole and pixel electrode photoreist patterns.

5. The method of claim 1, wherein the plurality of alignment marks are formed at the time of the first roller printing process, to correctly dispose each pattern to each alignment mark at the time of transferring and to prevent an inconsistency between the patterns generated at the time of aligning the patterns.

6. The method of claim 1, wherein the forming the plurality of alignment marks are formed at the time of the first to fourth roller printing processes, to correctly dispose each pattern to each alignment mark at the time of transferring and to prevent an inconsistency between the patterns generated at the time of aligning the patterns.

7. A fabrication method of a liquid crystal display device, comprising:
    forming a metal layer on a substrate;
    forming a gate photoresist pattern on the metal layer by a first roller printing process, wherein the first roller printing process comprises of providing a cliché on which the gate photoresist pattern is deposited; contacting a roller with the cliché in which the gate photoresist pattern is contained; rotating a roller on the cliché, to transfer the gate photoresist pattern contained in the cliché onto a surface of the roller; and contacting the roller with the metal layer on the substrate and rotating on the substrate to retransfer the gate photoresist pattern onto the surface of the roller to form the gate photoresist pattern on the metal layer;

etching the metal layer using the gate photoresist pattern as a mask to form a gate line, removing the gate photoresist pattern;

sequentially forming a gate insulating layer, a semiconductor layer, and a high-concentrated N+ layer over the substrate including the gate line;

forming an active photoresist pattern on the high-concentrated N+ layer by a second roller printing process, wherein the second roller printing process comprises providing a cliché on which an active photoresist pattern is deposited; contacting a roller with the cliché in which the active photoresist pattern is contained; rotating a roller on the cliché, to transfer the active photoresist contained in the cliché onto a surface of the roller; and contacting the roller with the high-concentrated N+ layer on the substrate and rotating on the substrate to retransfer the active photoresist pattern onto the surface of the roller to form the active photoresist pattern on the high-concentrated N+ layer;

etching the high-concentrated N+ layer and the semiconductor layer using the active photoresist pattern as a mask to form a semiconductor layer pattern and a high-concentrated N+ layer pattern defined as an active region;

removing the active photoresist pattern;

forming a conductive layer over the substrate including the high-concentrated N+ layer pattern and the semiconductor layer pattern;

forming a photoresist layer on the conductive layer;

patterning the photoresist layer by performing a lithography process to form a photoresist layer pattern;

removing the conductive layer by the photoresist layer pattern as a mask to form source and drain electrodes electrically separated from each other, wherein when the source/drain electrodes are formed, a data line and a storage electrode are formed simultaneously by the mask process, and wherein the conductive layer is removed by a wet etch process;

removing the high-concentrated N+ layer pattern on a channel region of the semiconductor layer pattern, wherein the high-concentrated N+ layer pattern is removed by a dry etch process;

removing the photoresist layer pattern;

forming a passivation layer over the source and drain electrodes;

forming a contact hole photoresist pattern on the passivation layer by a third roller printing process, wherein the third roller printing process comprises of providing a cliché on which a contact hole photoresist pattern is deposited; contacting a roller with the cliché in which the contact hole photoresist pattern is contained; rotating a roller on the cliché, to transfer the contact hole photoresist contained in the cliché onto a surface of the roller; and contacting the roller with the passivation layer on the substrate and rotating on the substrate to retransfer the contact hole photoresist pattern onto the surface of the roller to form the contact hole photoresist pattern on the passivation layer;

etching the passivation layer by using the contact hole photoresist pattern as a mask to form a contact hole;

removing the contact hole photoresist pattern;

forming a transparent electrode layer over the passivation layer and the contact hole;

forming a pixel electrode photoresist pattern over the pixel electrode layer by a fourth roller printing process, wherein the fourth roller printing process comprises of providing a cliché on which a pixel electrode photoresist pattern is deposited; contacting a roller with the cliché in which the pixel electrode photoresist pattern is contained; rotating a roller on the cliché, to transfer the pixel electrode photoresist contained in the cliché onto a surface of the roller; and contacting the roller with the passivation layer on the substrate and rotating on the substrate to retransfer the pixel electrode photoresist pattern onto the surface of the roller to form the pixel electrode photoresist pattern on the passivation layer; and removing the transparent electrode layer by using the pixel electrode photoresist pattern as a mask to form a pixel electrode electrically connected with the drain electrode, wherein a plurality of alignment marks are simultaneously formed at the time of the roller printing process.

8. The method of claim 7, wherein the mask applied over the photoresist layer in the step of applying the mask is the only mask applied throughout the method of claim 7.

9. The method of claim 7, wherein the plurality of alignment marks are formed at the time of the first roller printing process, to correctly dispose each pattern to each alignment mark at the time of transferring and to prevent an inconsistency between the patterns generated at the time of aligning the patterns.

10. The method of claim 7, wherein the plurality of alignment marks are formed at the time of the first to fourth roller printing processes, to correctly dispose each pattern to each alignment mark at the time of transferring and to prevent an inconsistency between the patterns generated at the time of aligning the patterns.

* * * * *